H. Campbell,
Stuffing-Box.
Nº 28,648. Patented June 12, 1860.
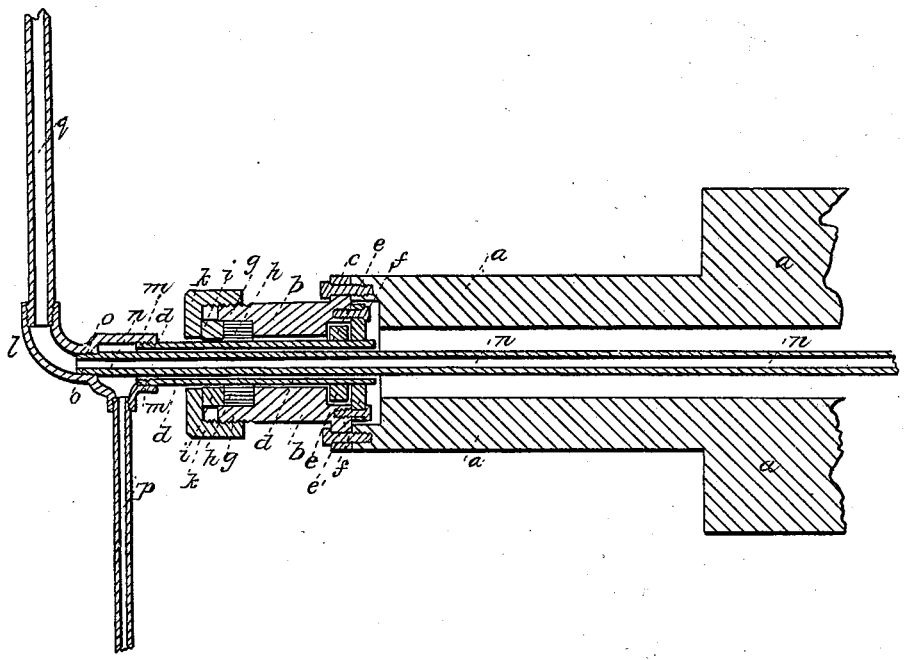
Witnesses.
Alb. C. Richard
James Gallagher
Inventor.
Hugh Campbell

UNITED STATES PATENT OFFICE.

HUGH CAMPBELL, OF NEWTOWN, CONNECTICUT.

STEAM STUFFING-BOX FOR REVOLVING ROLLS.

Specification of Letters Patent No. 28,648, dated June 12, 1860.

*To all whom it may concern:*

Be it known that I, HUGH CAMPBELL, of Newtown, in the county of Fairfield, in the State of Connecticut, have invented a new and Improved Steam Stuffing-Box for Revolving Rolls; and I do hereby declare that the following is a full and exact description thereof, reference being had to the accompanying drawings and to the letters of reference marked thereon.

The drawings represent a vertical section of my improved steam stuffing box and its fittings.

The nature of my invention consists in constructing a steam-stuffing-box the external diameter of the friction surface of which is much less than that of any heretofore used, thereby greatly lessening the attendant friction.

To enable others skilled in the art to make and use my invention I will proceed to describe its construction and operation.

(a), represents the end of the (journal of the) roller to be heated while it is revolving in its bearings, (b), is the stuffing box, which is fastened steam tight on the end of the roll (a,) in any suitable manner so as to revolve with it; in this instance the stuffing box is bolted to the end of the roll (a,) at (c,) and (c').

(d,) is a piece of ordinary steam tube or pipe which is turned-off in a lathe so as to be round and smooth; at (e,) is represented a collar firmly fastened on this piece of steam pipe by shrinking the same on in a red heat; this collar (e,) is likewise turned-off round and smooth; a recess is made in the stuffing box (b,) in which the collar (e) fits so as to permit the roll (a,) freely to revolve around it; the flange or ring (f,) is bolted on the end of the stuffing box (b) as shown in the drawing, and forms, with the recess in said stuffing box, a chamber to inclose the collar (e).

The collar (e,) serves to prevent end-motion of pipe (d,) since the latter is confined by means of ring (f), against the collar (e), which holds the said collar in the recess of the stuffing box as before mentioned. Ring (f,) is received in a recess provided for it in the end of roll (a).

At the front end of stuffing box (b,) is a chamber (g,) to receive the packing (h,) and metal follower (i); the nut or thimble (k) screws on to the end of the stuffing box (b) and serves to compress the packing (h) against the bottom of chamber (g,), and thereby to expand it so as to make a steam tight joint with the inside of said chamber (g,) and the periphery of pipe (d).

(l,) is an elbow into which the pipe (d,) is secured at (m,), this elbow likewise has a pipe screwed into its innerside at (o,), this pipe (n,) is of small diameter, it passes freely through the pipe (d,) into the hollow portion of the roll (a,) in such a manner as to leave a clear space through which the condense water can escape by the discharge pipe (p,); the pipe (q,) is also inserted in the elbow (l,). It is by this pipe that steam is introduced through the small pipe (n) into the hollow roll (a,). The pipes (p,) and (q,), being rigidly connected to the pipes in the building where the roll (a,) may be operated, prevent the pipe (d,) from revolving with the revolving roll (a).

The operation of my improved steam stuffing box is as follows: Steam is admitted by opening a valve in pipe (q,), it will flow through elbow (l,) and small pipe (n,) into roll (a) to heat said roll; now on the roll (a) being revolved the packing (h,) will slide around the smooth surface of pipe (d,) without the escaping of any of the steam. When steam has become condensed into water, inside the roll (a,) it can be discharged through the open space left between the outside of pipe (n,) and the inside of pipe (d,) through elbow (l) and pipe (p).

The revolving roll (a) can be cooled as well as heated by means of this improved stuffing box, by simply introducing cold water instead of steam. Heretofore all stuffing boxes applied to the rollers used in the manufacture of india rubber, gutta percha, paper, etc. in which steam or cold water are introduced while the rolls revolve, were of much larger diameter on the friction-surface than my pipe (d,) while the packing employed with such stuffing boxes had a much more extended surface subjected to friction.

The advantages obtained in my new arrangement produce a large saving of motive power by the reduction of the friction which I attain, and a saving of expense in first cost by the cheapness of my device compared with the stuffing boxes hitherto used.

What I claim as my invention and desire to secure by Letters Patent is—

The arrangement of pipe (*n*,) within pipe (*d*) as herein described, in combination with the stuffing box (*b*,) and its appendages, and roll (*a*,), for the purpose and operating substantially in the manner as herein fully set forth.

HUGH CAMPBELL.

Witnesses:
ALB. C. RICHARDS,
JAMES GALLAGHER.